Patented July 3, 1934

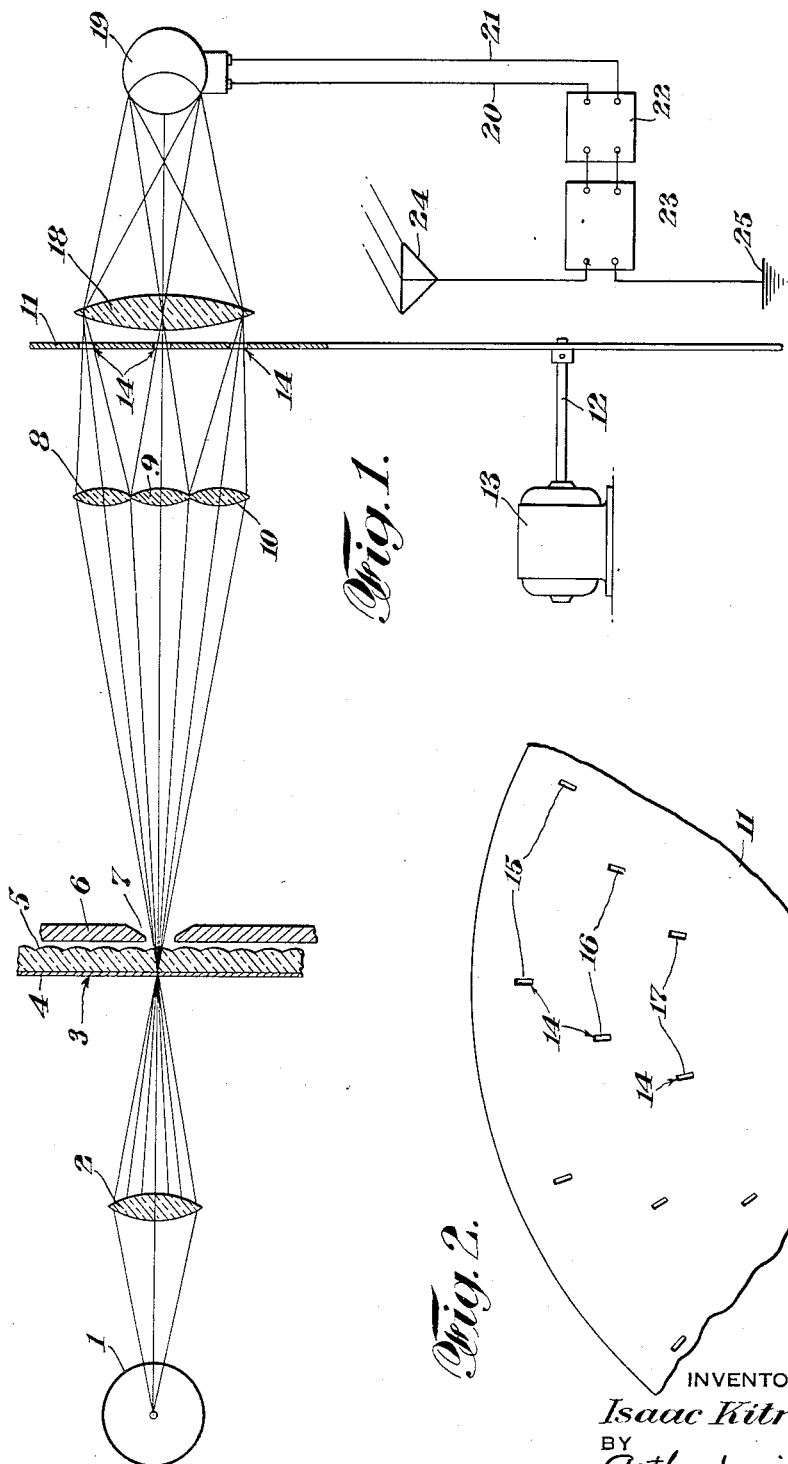

1,965,103

UNITED STATES PATENT OFFICE 1,965,103

TELEVISION TRANSMITTER

Isaac Kitroser, Paris, France, assignor to Keller-Dorian Colorfilm Corporation, New York, N. Y., a corporation of Delaware Application April 6, 1932, Serial No. 603,464

15 Claims. (Cl. 178—6)

The object of my invention is to provide a television transmitter which is very simple in construction and which, therefore, will be free from disadvantages inherent in prior constructions.

The object of my invention is particularly to avoid the presence of unnecessary diaphragms, which cause diffraction effects, and to avoid the presence of unnecessary objectives by using a minimum number of objectives in accomplishing the desired result. Further objects of my invention will appear from the detailed description of the same hereinafter.

While my invention is capable of embodiment in many different forms, for the purpose of illustration I have shown only certain forms of the same in the accompanying drawing, in which—

Fig. 1 is a diagrammatic representation of an apparatus made in accordance with my invention; and Fig. 2 is an elevation of the scanner used in the transmitting apparatus.

In the drawing, I have shown a source of light 1 which may be a Cotton incandescent lamp, which has a straight filament parallel to the lenticulations of the film 3 from which the pictures are to be projected. The light from the lamp 1 passes through a condenser 2 which may be a good achromatic objective that will give an image of the straight filament of the lamp 1 in a sharp line on the lenticulated film 3, having the picture carried by a sensitive emulsion 4 at the rear thereof and having transverse cylindrical lenticles 5 at the front thereof. The film 3 passes in the rear of a gate 6 having an opening 7 through which the light rays may pass and the film 3 is fed continuosly past the opening 7. The light, after passing through the film 3, is received by three lenses 8, 9 and 10, which are located in such a manner as to correspond to the red, green and blue color areas of the color filter used in taking the picture on the goffered film. These lenses 8, 9 and 10 may be ordinary or achromatic lenses and their size is such as to receive the light from the film 3 in the same angular directions as the light which was directed from the three color zones onto the film in taking the picture. Furthermore, these three objectives 8, 9 and 10 produce an image of the line of the film being illuminated near the point where there is located a scanner 11 carried by a shaft 12 driven from an electric motor 13 and which is synchronized with the scanner of the receiving apparatus in any desired manner, the same, for example, as in the application of Samuel Bayard Colgate hereinafter referred to. The scanner 11 has a plurality of slits 14 which are radially arranged in a succession of groups of three, each group being comprised of slits 15, 16 and 17 which correspond to the lenses 8, 9 and 10 so as to transmit successively the impressions from the light rays corresponding to the said blue, green and red areas. These openings are made in the form of slits which travel across the illuminated line of the film in a position in which the slit is at right angles to the film. These slits can be made more accurately than when made in the form of round holes and there is less diffraction produced. Immediately beyond the scanning disk 11 there is located an objective 18, in the form of a large field-lens, which is in the focal plane of the lenses 8, 9 and 10 and which is adapted to concentrate the light on a photo-electric cell 19. The photo-electric cell 19 is constructed in any desired manner, like photo-electric cells such as are used in television practice. The current therefrom passes by way of leads 20 and 21 to one or more vacuum tube amplifiers 22 and thence to a standard radio transmitter 23 which is connected to an aerial 24 and to a ground 25.

The receiving apparatus may be of any desired type but may be, for example, the same as the receiving apparatus as set forth in detail in the application of Samuel Bayard Colgate upon Television in colors, filed December 26, 1931.

In the operation of my apparatus the light proceeds from the linear filament in the lamp 1 through the condenser 2, and is then concentrated in the form of a line parallel to the gofferings of the film 3 carrying the cinematographic picture to be transmitted. The light therefrom is projected onto three lenses 8, 9 and 10, which correspond in position to the three color zones of the color filter used in taking the picture on the said film. That is to say, for example, the light which passes through the lens 8 will correspond to the red, the light which passes through the lens 9 will correspond to the green and the light which passes through the lens 10 will correspond to the blue of said color filter. The line of the film 3 illuminated at any given time is thus scanned in succession by the disk 11 so as to transmit through said disk 11 the red, green and blue of each portion of said line, the light being transmitted, accordingly, through the photoelectric cell 19 and thence to the aerial 24 from which it may be received by any appropriate receiver, as, for example, the receiver described in detail in the application of Samuel Bayard Colgate above referred to. Inasmuch as the light at the film 3 is not controlled by the presence of an opening, and as the light passes through the disk 11 through slits, and as no other diaphragms are present in the transmitter, there is practically no diffraction resulting in the transmission. Furthermore, it will be noted that the light is thrown directly from the film 3 onto the three lenses 8, 9 and 10 provided for the light corresponding to the three different colors, without passing through any intermediate objective. This conduces to the simplicity and general effectiveness of the apparatus.

While I have described my invention above in detail I wish it to be understood that many changes may be made therein without departing from the spirit of the same.

I claim:

1. A television transmitter adapted for transmitting cinematographic pictures in colors, comprising means to concentrate light in the form of a line upon a lenticulated film, a plurality of lenses for separately concentrating the light from the different color registration zones of the film, a scanner adapted to transmit the light from said lenses in succession, means comprising a photo-electric cell adapted to receive the light transmitted from the different-color registration zones and means for producing radio waves therefrom.

2. A television transmitter adapted for transmitting cinematographic pictures in colors, comprising means to concentrate light in the form of a line upon a constantly moving lenticulated film, a plurality of lenses for separately concentrating the light from the different color registration zones of the film, a scanner adapted to transmit the light from said lenses in succession, means comprising a photo-electric cell adapted to receive the light transmitted from the different-color registration zones and means for producing radio waves therefrom.

3. A television transmitter adapted for transmitting cinematographic pictures in colors, comprising means to concentrate light in the form of a line upon a lenticulated film, a plurality of lenses for separately concentrating the light from the different color registration zones of the film, a slitted scanning disk adapted to transmit the light from said lenses in succession, means comprising a photo-electric cell adapted to receive the light transmitted from the different-color registration zones and means for producing radio waves therefrom.

4. A television transmitter adapted for transmitting cinematographic pictures in colors, comprising means to concentrate light in the form of a line upon a constantly moving lenticulated film, a plurality of lenses for separately concentrating the light from the different color registration zones of the film, a slitted scanning disk adapted to transmit the light from said lenses in succession, means comprising a photo-electric cell adapted to receive the light transmitted from the different-color registration zones and means for producing radio waves therefrom.

5. A television transmitter adapted for transmitting cinematographic pictures in colors, comprising means to concentrate light in the form of a line upon a lenticulated film, a plurality of lenses for separately concentrating the light from the different color registration zones of the film, a scanner adapted to transmit the light from said lenses in succession, means comprising a single photo-electric cell adapted to receive the light transmitted from the different-color registration zones and means for producing radio waves therefrom.

6. A television transmitter adapted for transmitting cinematographic pictures in colors, comprising means to concentrate light in the form of a line upon a constantly moving lenticulated film, a plurality of lenses for separately concentrating the light from the different color registration zones of the film, a scanner adapted to transmit the light from said lenses in succession, means comprising a single photo-electric cell adapted to receive the light transmitted from the different-color registration zones and means for producing radio waves therefrom.

7. A television transmitter adapted for transmitting cinematographic pictures in colors, comprising means to concentrate light in the form of a line upon a lenticulated film, a plurality of lenses for separately concentrating the light from the different color registration zones of the film, a slitted scanning disk adapted to transmit the light from said lenses in succession, means comprising a single photoelectric cell adapted to receive the light transmitted from the different-color registration zones and means for producing radio waves therefrom.

8. A television transmitter adapted for transmitting cinematographic pictures in colors, comprising means to concentrate light in the form of a line upon a constantly moving lenticulated film, a plurality of lenses for separately concentrating the light from the different color registration zones of the film, a slitted scanning disk adapted to transmit the light from said lenses in succession, means comprising a single photo-electric cell adapted to receive the light transmitted from the different-color registration zones and means for producing radio waves therefrom.

9. A television transmitter adapted for transmitting cinematographic pictures in colors, comprising means to concentrate light in the form of a line upon a lenticulated film, a plurality of lenses for separately concentrating the light from the different color registration zones of the film, a scanner adapted to transmit the light from said lenses in succession, means comprising a photo-electric cell adapted to receive the light transmitted and means for producing radio waves therefrom, the apparatus being without any objective between the film and said plurality of objectives.

10. A television transmitter adapted for transmitting cinematographic pictures in colors, comprising means to concentrate light in the form of a line upon a constantly moving lenticulated film, a plurality of lenses for separately concentrating the light from the different color registration zones of the film, a scanner adapted to transmit the light from said lenses in succession, means comprising a photo-electric cell adapted to receive the light transmitted and means for producing radio waves therefrom, the apparatus being without any objective between the film and said plurality of objectives.

11. A television transmitter adapted for transmitting cinematographic pictures in colors, comprising means to concentrate light in the form of a line upon a lenticulated film, a plurality of lenses for separately concentrating the light from the different color registration zones of the film, a scanner adapted to transmit the light from said lenses in succession, means comprising a photo-electric cell adapted to receive the light transmitted from the different-color registration zones, an objective for focusing the light on the said cell, and means for producing radio waves therefrom.

12. A television transmitter adapted for transmitting cinematographic pictures in colors, comprising means to concentrate light in the form of a line upon a constantly moving lenticulated film, a plurality of lenses for separately concentrating the light from the different color registration zones of the film, a scanner adapted to transmit the light from said lenses in succession, means comprising a photo-electric cell adapted to receive the light transmitted from the different-color registration zones, an objective for focusing the light on the said cell, and means for producing radio waves therefrom.

13. A television transmitter adapted for transmitting cinematographic pictures in colors, comprising means to concentrate light in the form of a line upon a lenticulated film, a plurality of lenses for separately concentrating the light from the different color registration zones of the film, a slitted scanning disk adapted to transmit the light from said lenses in succession, means comprising a photo-electric cell adapted to receive the light transmitted from the different-color registration zones, an objective for focusing the light on the said cell, and means for producing radio waves therefrom.

14. A television transmitter adapted for transmitting cinematographic pictures in colors, comprising means to concentrate light in the form of a line upon a constantly moving lenticulated film, a plurality of lenses for separately concentrating the light from the different color registration zones of the film, a slitted scanning disk adapted to transmit the light from said lenses in succession, means comprising a photo-electric cell adapted to receive the light transmitted from the different-color registration zones, an objective for focusing the light on the said cell, and means for producing radio waves therefrom.

15. A television transmitter adapted for transmitting cinematographic pictures in colors, comprising a condenser lens adapted to concentrate light in the form of a line upon a lenticulated film without the aid of a diaphragm, a plurality of lense for separately concentrating the light from the different-color registration zones of the film, a scanner adapted to transmit the light from said lenses in succession, means comprising a photo-electric cell adapted to receive the light transmitted and means for producing radio waves therefrom, the apparatus being without any objective between the film and said plurality of objectives.

ISAAC KITROSER.